United States Patent [19]
Davis

[11] Patent Number: 4,554,495
[45] Date of Patent: Nov. 19, 1985

[54] DATUM REFERENCE FOR TOOL TOUCH PROBE SYSTEM

[75] Inventor: Richard K. Davis, Charlottesville, Va.

[73] Assignee: Ormand R. Austin, Charlottesville, Va.

[21] Appl. No.: 645,280

[22] Filed: Aug. 29, 1984

[51] Int. Cl.⁴ ............................................. G05B 19/24
[52] U.S. Cl. ................................. 318/572; 318/640; 364/474
[58] Field of Search ............... 318/460, 571, 572, 569, 318/39; 364/474

[56] References Cited

U.S. PATENT DOCUMENTS

| | | | |
|---|---|---|---|
| 3,671,840 | 6/1972 | Meyer et al. | 318/39 |
| 4,382,215 | 5/1983 | Barlow et al. | 318/568 |
| 4,428,055 | 1/1984 | Zubrick et al. | 318/572 X |
| 4,510,566 | 4/1985 | Gordon | 318/572 X |

FOREIGN PATENT DOCUMENTS

| | | | |
|---|---|---|---|
| 0591825 | 2/1978 | U.S.S.R. | 318/460 |
| 0954931 | 9/1982 | U.S.S.R. | 318/460 |

*Primary Examiner*—B. Dobeck
*Attorney, Agent, or Firm*—Ormand R. Austin

[57] ABSTRACT

A reference post assembly (50) directly mounted on a numerically controlled machining system such as a lathe obviates the need for a datum ring including reference datum surfaces (42,44) and being conventionally provided on the external cylindrical surface and face of a chuck (36) which holds the workpiece (41) being machined. The reference post assembly (50) is comprised of an elongated reference post member (52) of selected cross section, i.e., square or round, which is resiliently mounted on the lathe in a known calibrated position with respect to the workpiece (41). The post (52) is ultrasonically vibrated in a longitudinal mode by one or more piezoelectric elements (54) coupled to an electrical signal oscillator (56). A frequency matched vibration sensor (72) in the form of an accelerometer is mounted on a machine tool carrying turret (26) and is adapted to sense the vibration imparted to the reference post when a machine tool (32) utilized as a touch probe is brought into contact with the reference post. The signal output of the accelerometer (72) is fed from the turret (26) by a rotating coupler (74) where it is conditioned and thereafter fed to a numerical control unit (46) and being used either for calibrating or gauging of parts in a machining operation.

20 Claims, 6 Drawing Figures

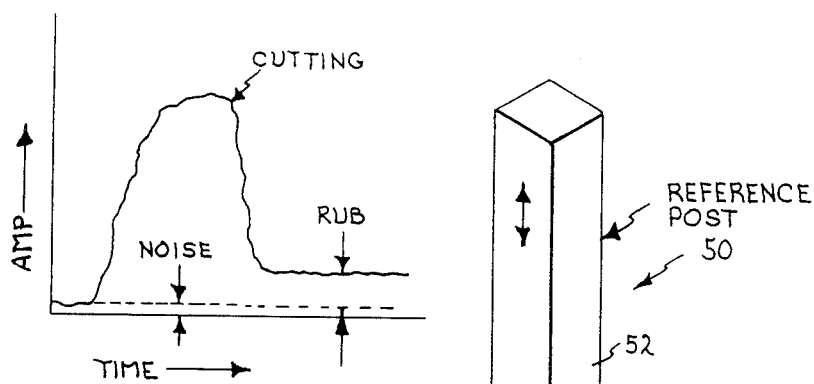
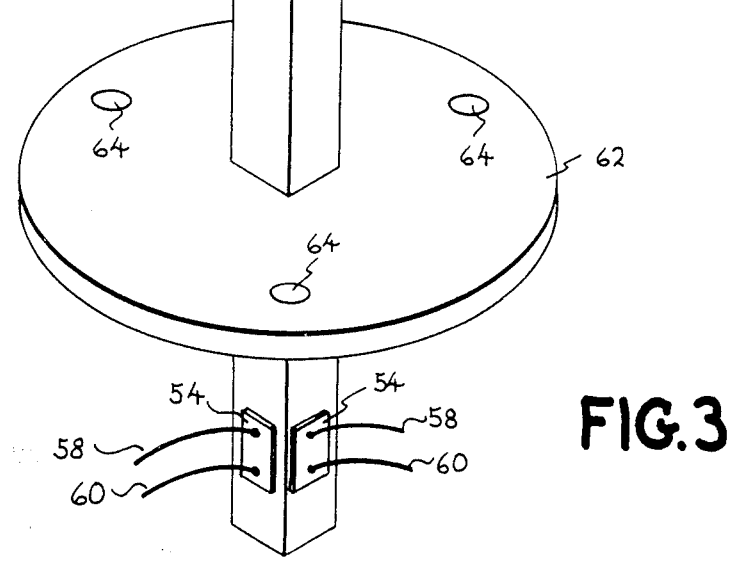
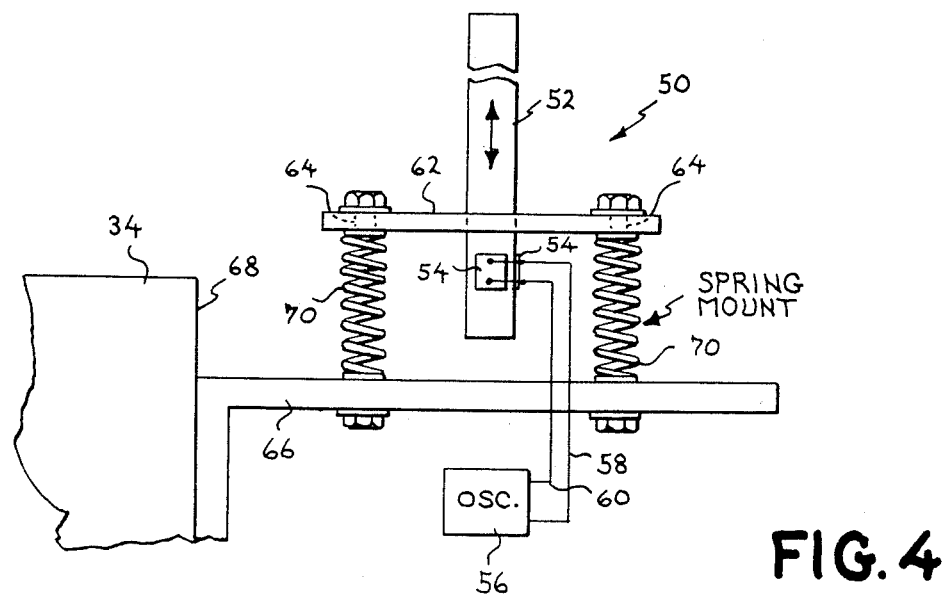

DATUM REFERENCE FOR TOOL TOUCH PROBE SYSTEM

BACKGROUND OF THE INVENTION

1. Field of the Invention

The present invention relates in general to closed loop numerically controlled machining systems and more particularly to tool touch detectors for gauging.

2. Description of the Prior Art

The technology relating to automated precision machining is developing at a very rapid rate. Systems that ar totally dependent on manual operations have largely given way to techniques whereby manufactured parts are made with general purpose, numerically controlled machining systems. Althout cutting or other removal of material occurs automatically in such systems, numerous manual operations are still required, primarily for measuring the machined dimensions and for making cutter adjustments using an ordinary numerical control cutter offset. These manual measurements and adjustments of the cutting tool are necessary to take into account a large number of variables, such as: wear of the cutting tool; repositioning and/or replacement of the cutting tool; as well as dimensional changes of the cutting tool, of the workpiece and of the machining apparatus itself due to such factors as heating; deflection under load and the like.

By way of example, in a typical operation carried out with a numerically controlled machine tool such as a lathe, certain adjustments, i.e. tool offsets, must be manually implemented by the operator after the machine is set up for the manufacture of a particular workpiece or part. Prior to the start of machining the operator must advance the cutting tool to a tool setting surface and determine the tool position by manually measuring the space between the tool and the reference surface. This is normally done with a piece of shim material or the like, and such measurements then form the basis for manually making tool offsets. Where the lathe includes tool holding means such as a multiple tool turret, this operation must be carried out separately for each tool as well as for each of the axes (of motion) of the machine. Prior to making the final or finishing cut for a particular workpiece surface, the various dimensions of the semi-finished workpiece surface are measured by using a hand-held gauge. This enables the operator to determine the required offset of the cutting tool which is used for the finishing cut. After the finishing cut is made, the workpiece is again checked with the hand-held gauge in order to measure the conformance of the actual dimensions of the finished surface to the desired dimensions.

The manual operations described above are individually time consuming and take up a significant amount of the total time required to machine a particular workpiece to the desired dimensions. This serves to limit the manufacturing capacity of the machine tool. Considering present day costs of a lathe or a milling machine (machining center), any reduction of the capacity of the machine tool becomes a matter of economic significance. Further, all such manual operations further open the manufacturing process to human error.

As is generally recognized, the solution to the foregoing problems is to automate manual measurements and the manual adjustments of the cutting tool, e.g. by the use of a computer operated numerical control system. In such a system the computer may either be positioned remote from the numerical control unit, or it may be incorporated in the latter, e.g. in the form of a microcomputer. Alternatively, a computing capability may be provided remote from the numerical control unit as well as being incorporated into the latter. Instead of downloading successive blocks of data stored on tape or the like, as is the case in an ordinary NC system, a computer numerical control (CNC) system is capable of storing entire programs and calling them up in a desired sequence, editing the programs, e.g. by addition or deletion of blocks, and carrying out the computations of offsets and the like.

Although fully automatic systems have not been widely adopted at this stage of development of the precision machining field, a considerable amount of development work has been done to date, much of it limited to special purpose situations wherein a single machining operation is repetitively carried out. It is also known to mount a sensor in the form of a touch trigger probe on the bed of the machining apparatus, or on a pivotal arm that can be swung out of the way when desired. The position of the cutting tool can be calibrated against such a probe by noting the tool position when contact with the probe occurs. From the observed deviations between the programmed and the actual positions, a compensating offset may be determined and stored in the memory associated with the computer numerical control means. The offset compensates for the difference between the programmed contact position and the actual contact position.

A system and method which incorporates the features described above is disclosed in U.S. Pat. No. 4,382,215 entitled, "System And Method Of Precision Machining", which issued to Allan R. Barlow and William A. Hunter on May 3, 1983, and which is assigned to the assignee of the present application. As disclosed in the Barlow, et al. patent, a touch trigger probe or part sensor is mounted in the tool holding means. The latter probe is first calibrated against datum or reference surfaces and is subsequently used to calibrate the tool sensor probe. Only then is the cutting edge of the selected tool calibrated by contact with the tool sensor probe. The initial tool offsets which are determined from the results of this operation are stored in numerical control (NC) means. After machining has taken place, the part sensor probe is again calibrated and is then used to probe the machined surface(s) of the workpiece. The information so obtained determines the final offsets required for the finishing cut. Subsequently, the finished surface may be probed to determine its conformance with the desired dimensions. Although simple in construction, the touch trigger probe must be specifically configured for a class fo features to be probed. The probes themselves, which are normally purchased as commercial products from specific vendors, tend to be fragile and they occupy at least one tool position on the tool holding means, e.g. on the lathe turret and furthermore cannot reach all cuts.

In order to overcome the limitations of a touch trigger probe system, the state of the art advanced to utilizing the cutting tool itself as a means to gauge the part previously machined by the tool itself. Such a system is shown and disclosed in U.S. Pat. No. 4,428,055, entitled, "Tool Touch Probe System And Method Of Precision Machining", which issued to John R. Zurbrick and John R. Kelley on Jan. 24, 1984, and which is also assigned to the assignee of the present invention. As disclosed in the Zurbrick, et al. patent, vibration sensing is used to detect contact between the cutting edge of the cutting tool and position referene surfaces, with the cutting edge being calibrated against the surfaces under closed loop control. The deviation between the programmed and the actual positions of the cutting edge at each reference surface is determined and an initial compensating tool position offset is automatically provided in each axis and is entered into numerical control. After machining has been initiated, probing of the workpiece occurs at least once before the final cut is taken, with the tool functioning as a tool touch probe during this operation. A frequency matched acoustic vibration transducer, mounted on the turret, stores vibrations emanating from the tool as a calibrated cutting edge is brought into contact with the machined surface. Appropriate tool position offsets are determined and entered into the numerical control means at this time to assure that the dimensions of the finished surface will conform to the desired dimensions. After final machining has taken place, the finished surface is again probed with the calibrated cutting edge, using vibration sensing. Notwithstanding the significant advance in the art provided by this type of system, the tool touch probe cannot always reach the two reference or datum surfaces of a particular machine when the tool itself is used as a gauge.

Both U.S. Pat. Nos. 4,382,215 and 4,428,055 are specifically meant to be incorporated herein by reference.

Accordingly, it is an object of the present invention to provide an improvement in gauging machined parts.

It is a further object of the invention to provide an improvement in touch probe systems utilized in closed loop numerically controlled machining systems.

It is still another object of the invention to provide an improvement in datum surface means for a tool touch probe system.

And yet another object of the invention is to provide a means for providing datum surfaces which can be used in place of a datum ring, for example, in the spindle of a lathe type of numerically controlled machine tool.

SUMMARY

Briefly, the foregoing and other objects are achieved in accordance with the invention wherein, in a preferred form, an ultra-sonically vibrating elongated reference post of a predetermined cross section is mounted a known distance from the center line of a rotatable spindle (or other known reference point) of a numerically controlled machine tool (such as a lathe) and is oriented with its longitudinal axis vertical with respect to the workpiece. A cutting tool, which functions not only as a cutting element but also as a touch probe, is used in conjunction with the vibrating reference post for gauging the part being machined. The post is preferably vibrated longitudinally. Tool touches of the post, and surfaces on the part being machined, are sensed by means of a frequency matched accelerometer mounted on a turret which holds the tool. The signal output of the accelerometer is indicative of the tool touched. These signals are coupled to closed loop numerical control means by means of a rotating coupler and signal conditioning circuitry. Since the precise location of the vibrating post datum reference surface is precisely known within the tool coordinate reference system, once tool contact with the post is established, location of the tool surface becomes precisely known. This allows correction within the numerical control system for tool wear and variations in tool size, for example. In effect, the vibrating datum surface is used as a tool surface calibrator. Once calibrated, the tool is useful to probe the workpiece surface. Contact with the workpiece surface is detected by "rubbing vibrations" transmitted to the accelerometer. By comparing the surface locations, one to the other within the coordinate system or with respect to the location of the post, the workpiece dimensions can be determined.

BRIEF DESCRIPTION OF THE DRAWINGS

While the present invention is defined in the claims annexed to and forming a part of this specification, a better understanding can be had by reference to the following description when taken in conjunction with the accompanying drawings in which:

FIG. 3 is a perspective view of a preferred embodiment of a reference post shown in accordance with the invention;

FIG. 4 is a simplified elevational view illustrative of the reference post assembly including the reference shown in FIG. 4 and being resiliently spring mounted on the lathe shown in FIG. 2;

FIG. 6 is a characteristic curve helpful in understanding the operation of the invention.

DESCRIPTION OF THE PREFERRED EMBODIMENT

Figure 1:
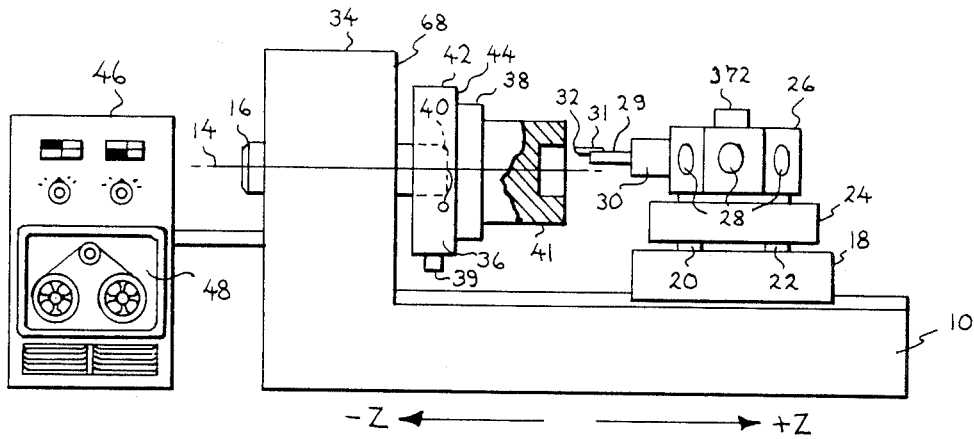
FIG. 1 is a simplified elevational view of a horizontal turret lathe which constitutes known prior art and whose rotatable turret is adapted to bring a plurality of cutting tools or probes into operating position.

Referring now to the drawings and more particularly to FIG. 1, shown thereat is a simplified side elevational view of machining apparatus in the form of a horizontal turret lathe. Typically a turret lathe operates along two mutually perpendicular axes, the X axis and Z axis, with the X axis being designated an axis across the bed of the machine, while the Z axis lies along the length of the bed. As shown, the bed of the lathe includes a frame 10 which carries a pair of guideways, one of which is shown by reference numeral 12 and which extends along the Z axis. Parallel to the Z axis is the center-line 14 of a lathe spindle 16. A saddle or lateral slide 18 is slidably disposed on the guideways 12 and is capable of being bi-directionally positioned along the Z axis in either a forward (toward the workpiece, −Z) or reverse (away from the workpiece, +Z) direction from the position shown in FIG. 1. Positioning of the saddle 18 along the Z axis is carried out be means of a lead screw arrangement, not shown, which may be driven by a conventional DC positioning motor arrangement.

The saddle 18, moreover, carries a pair of lateral ways 20 and 22 on which a cross slide 24 is slidably disposed so as to be capable of being positioned in the X axis, not shown, but which is normal to the plane of the drawing. Positioning of the cross slide 24 in the X axis is likewise carried out by means of the lead screw arrangement which may be driven by a DC positioning motor. Each of the electric motors or lead screws may have a conventional resolver or encoder coupled thereto adapted to provide a feedback signal indicative of the rotary position of the corresponding component. These feedback signals are representative of the linear position of the saddle 18 and the cross slide 24 along their respective axes. Alternatively, suitable electronic or opto-electronic encoding devices may be used to provide signals directly representative of the linear position of the saddle 18 and the cross slide 24.

A turret 26 is carried by the cross slide 24 and includes a plurality of tool locations 28, each capable of mounting a tool holder 30 thereon. In the arrangement shown in FIG. 1, the turret 26 is typically capable of mounting six separate cutting tools or touch probes at tool locations 28. By appropriately indexing, i.e. rotating the turret 26, each tool or probe may be brought into operating position as shown in the drawing. For the sake of simplicity, the turret 26 in FIG. 1 is illustrated as carrying only a single tool holder 30 and thus only one cutting tool 29 is shown. The tool 29 is additionally shown to include a tool insert 31 whose cutting edge 32 faces the workpiece.

The bed of the lathe illustrated in FIG. 1 further includes a spindle drive and gear box 34 which is located at one end thereof. The rotatable spindle 16 projects out of the drive and gear box assembly 34 and carries a chuck 36 which includes a set of jaws 38 for holding a workpiece 41. Spindle 16 additionally includes a spindle nose or face 40 which abuts chuck 36. The intersection of the plane of face 40 with the spindle axis or center line 14 defines the original "0" position or origin from which the manufacturer of the particular machine tool establishes machine element and cutting tool locating specifications for use in programming the system. While all program positions are referenced to the origin, the measuring system of the machine tool itself always acounts or measures relative to a home position. The latter is normally located as far away from spindle nose and center line as saddle 18 and cross slides are able to move.

The chuck 36, in accordance with the known prior art, further is configured to include a datum ring implemented by at least a pair of position reference surfaces or datum surfaces which are perpendicular to the X and Z axes, respectively. Each of these surfaces is positioned at a known, calibrated distance from the origin or "0" position. As shown, the external cylindrical surface 42 of the chuck constitutes one reference surface, while chuck face 44 provides the other reference surface.

As taught in the above referenced U.S. Pat. No. 4,428,055, issued to Zurbrick, et al., a predetermined type of acoustic vibration transducer 37 is mounted on the top of the turret and provides an electrical signal in response to sensed mechanical or acoustic vibrations. For example, "rubbing vibrations" are transmitted to the transducer when the cutting edge 32 makes contact with workpiece 41 during rotation. The rotation of the workpiece relative to the cutting edge creates the necessary rapid relative motion to produce vibrations. For probing purposes, tool 32 is brought lightly into contact with the surface of the workpiece and is quickly backed away. The applied force is kept to a minimum by avoiding cutting into the surface during the probing operation. Under certain conditions where marks on the finished workpiece cannot be tolerated, the workpiece may also be rotated in the reverse direction during the probing operation. Even under those circumstances, the finished workpiece surface may be marred, however slightly, from its contact with the cutting edge. Accordingly, when desired, a vibrator 39 shown mounted on the chuck 36 is adapted to impart small amplitude vibrations with the workpiece not rotating. These vibrations are transmitted from the workpiece 41 to the tool 32 and then to the transducer 37 through the tool holding means comprising the tool holder 30 and the turret 26. Thus rapid relative motion between the cutting edge of the tool and the workpiece surface is now provided by small amplitude reciprocating motion induced in the workpiece by the vibrator rather than by rotation of the workpiece. Rotation of the workpiece is normally halted during probing while the vibrator 39 is activated.

The unit shown in FIG. 1 designated by reference numeral 46 is the numerical control (NC) system. This system is electrically coupled to a number of different components in the machine tool (i.e., the lathe) such as the DC positioning motors, the resolvers, and the acoustic transducer, among other things. The numerical control 46 also includes a tape transport 48 which is adapted to store the numerical control programming for machining the workpiece in the form of code words representative of different kinds of instructions. For example, the program may be used to: index turret 26; to turn on the collant required for machining; to rotate the spindle in a selected direction and at a selected speed; to move the probe or tool in a particular sequence of steps; and for various other related purposes. The tape may also contain data or the desired dimensions of a particular surface which is to be machined, the allowable machining tolerance for each dimension and certain parameters which must be taken into consideration, depending upon the part which is to be machined, the particular tool or tools to be used, etc.

The numerical control unit 46 preferably includes a microprocessor which responds to stored instructions on the tape. The microprocessor causes the appropriate control signals to be issued which will give effect to the tape commands. The microprocessor also processes the data acquired through various probing (i.e., gauging) operations for computing offsets which may produce modifications of the cutting operations carried out by the machining program. Some of these functions may be carried out, however, in a remotely positioned computer, such as in a central computer of a distributed numerical control system so that the processed data is fed to unit 46 which then generates the appropriate control signals. In such an arrangement, the computing capability may be retained in the numerical control 46.

The data received from the probing operations, feedback data from the resolvers, and data loaded in through the program itself is procesed by the microprocessor to compute the aforesaid offsets. Motor control signals derived from the processed data are compared against the position feedback data received from the respective motor resolvers or from other position feedback means. A closed loop system is established in which the differential determined upon comparison of the two signals controls the position of the cutting edge of the tool or position of the measuring probe. The numerical control 46 may also be used to compute, display and print the physical dimensions of the workpiece as well as to compute deviations from the programmed values and display the allowed machining tolerances. The numerical control unit 46 may, for example, be implemented in the form of apparatus commercially available from General Electric Company, under the designation Mark Century ® 2000 Computer Numerical Control.

For a more comprehensive discussion of the operation of the machining system shown in FIG. 1, reference can be made to the above referenced Zurbrick, et al. patent, U.S. Pat. No. 4,428,055, which additionally discloses the concept of utilizing the cutting tool 29 as the tool touch probe for gauging the part or workpiece 41 being machined. For a particular machine, however, it is not always possible to reach the two reference or datum surfaces when using the cutting tool as a gauge.

Figure 2:
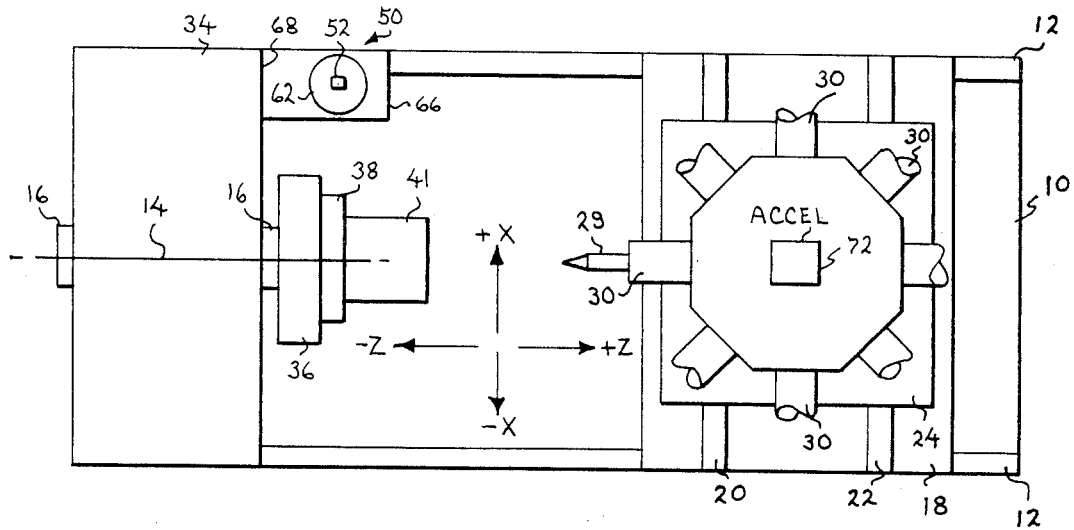
FIG. 2 is a simplified plan view of a horizontal turret lathe such as shown in FIG. 1 and now incorporating the features of the subject invention.

This now leads to the consideration of the present invention and more particularly to FIG. 2. Referring now to FIG. 2, a bed mounted vibrating reference post assembly 50, the details of which are shown in FIGS. 3 and 4, is adapted to provide at least one, but preferably two or more, datum surfaces which can be used in a tool touch probe system. The reference post assembly 50 is intended to replace the datum ring configuration of surfaces 42 and 44 of FIG. 1. The reference post 50 is positioned a known distance from the centerline 14 and is preferably oriented with its longitudinal axis vertical with respect to the workpiece 41 and tool 29. The reference post establishes a precisely known, fixed reference position for the tool and is used to calibrate the tool position prior to touching the workpiece. It will be recognized, of course, that the reference post 50 may be located as desired within the coordinate reference system of the lathe. The important point is that its datum surface be precisely and fixedly located.

Referring now to FIGS. 3 and 4, the reference post assembly 50 is comprised of, among other things, an elongated reference post member 52 whose cross section is shown being square but when desirable may be some other appropriate shape such as hexagonal, octagonal or circular. The square shape provides surfaces at right angles to each other so that datum surfaces are provided which are parallel to both the X and Z axes. The elongated member 52 is excited to vibrate sonically, but preferably ultrasonically, in a longitudinal mode by one or more piezoelectric elements 54 which are energized by means of an oscillator 56 shown in FIG. 4 and operating, for example, at 50 KHz. Suitable electrical leads 58 and 60 provide the required electrical coupling. The piezoelectric elements operate to excite the reference post 52 so that it moves linearly back and forth in a vertical direction as indicated. The reference post 52, moreover, is supported by a plate 62, which is positioned at a vibration node point on the post, and having three equally spaced mounting holes 64 for being resiliently mounted on an angle bracket 65 secured to the bed of the lathe, for example, at the inner surface 68 of the gear box 34 as shown in FIG. 2. When desirable, however, bracket 66 could extend downwardly and attach directly to the adjacent guideway 12. In any event, the bracket is firmly secured to the lathe and the reference post 52 can be considered part of a bed mounted assembly. Furthermore, the post member 52 and plate 62 are resiliently mounted on the bracket 66 by means of three mounting springs 68 by appropriate hardware utilized in cooperation with the holes 64 so that the resulting structure provides a compliant mount which is capable of moving in ±X and ±Z directions in the event of tool overtravel without disturbing the integrity of the post's reference position.

The reference post assembly shown in FIGS. 3 and 4, and more particularly the ultrasonically vibrating reference post 52, is intended to operate with an accelerometer which is shown by reference numeral 72 in FIG. 2 and which is mounted on the turret 26 for detecting ultrasonic vibrations from the reference post member 52 when the tool 29, when acting as a probe, touches the vibrating vertically oriented reference post 52. The accelerometer may be any one of a number of commerciably available types. For example, that commercially available from Vibra-Metrics under the part/model designation Model 1018 has been found to perform satisfactorily for purposes of the invention.

Figure 5:
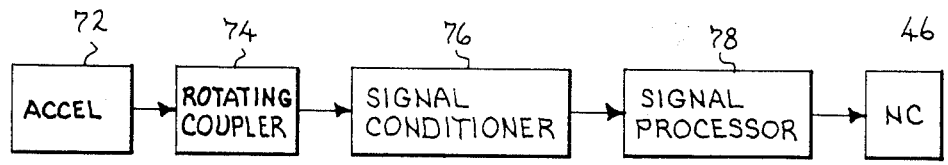
FIG. 5 is an electrical block diagram illustrative of the electrical signal path between the accelerometer mounted on the turret shown in FIG. 2 and the numerical control means such as shown in FIG. 1.

As shown in FIG. 5, the accelerometer is coupled to a rotating coupler 74 for coupling the electrical signal output of the accelerometer to the numerical control unit 46 (FIG. 1). Prior to being fed to the numerical control unit 46, however, the accelerometer signals are first conditioned by being fed through amplification and band-pass filter means as well as discriminator means. Signal conditioning provides a signal to the numerical control unit 46 free from spurious signals. Further as shown in FIG. 5, suitable signal processing circuitry 78 is included between the signal conditioning circuitry 76 and the numerical control unit 46. Preferably, the accelerometer 72 is resonant to the same frequency as the frequency of vibration of the reference post 52. This has the effect of increasing sensitivity so that contact between the tool surface and the surface of post 52 is more readily detectable. The frequency of vibration may be selected by an appropriate selection of the frequency of oscillator 56. As pointed out above, this may be on the order of 50 KHz.

In operation, a tool touch probe, for example, the tool 29 shown in FIG. 2, is caused to approach the reference post 52 until the accelerometer 72, through the processing circuitry, detects that a touch has occurred. At that touch location, the position of the tool is pinpointed. That position is recorded and stored in the numerical unit 46. The tool 29 is then backed off and driven towards the rotating workpiece 41 (FIG. 2) until a touch in the form of a "rubbing" signal, as opposed to a cutting signal, is sensed by the accelerometer 72. As indicated by FIG. 6, a rubbing of the tool against the workpiece produces a relatively low constant amplitude signal and is different from a signal resulting from cutting, scoring or gouging of the workpiece. Upon rubbing up against the workpiece, the position is again recorded and stored and the tool is reversed. The difference between the known reference position and the workpiece touch point provides the necessary information for computation of the part dimension. This is carried out in a well known manner, such as taught in U.S. Pat. No. 4,428,055, in the numerical control unit 46.

The present invention obviates the use of the rotating datum ring 36 on the spindle 40 as shown in FIG. 1. The advantages of the approach afforded by the present invention are several. For example, unlike the datum ring, the reference post 52 can be positioned to be accessible by all tools and approached for calibration in all directions. Moreover, multiple reference posts can be used, when desired, for different dimensioned points or tools. Further, since scoring of the datum ring may result after prolonged use, a datum post in accordance with the teachings of this invention will provide an extended useful life. Also, by first touching the vibrating post 52 with the tool 32 prior to touching the workpiece 41 an opportunity is available to perform a diagnostic check on the ultrasonic detector circuitry so that inadvertent gouging of the workpiece is avoided should the ultrasonic pickup or its associated circuitry fail in any way. Had the spindle datum been approached with circuitry which had, for some reason or another failed, extreme scoring or damage could occur. This results from the fact that it is customary on computer numerical control gauging routines to program in a small but significant (e.g. 0.1″) overtravel of the inspected part or datum surface. The compliance of the datum post wil absorb this tool overtravel without damage whereas the spindle datum will not. After the overtravel distance has been traversed, the CNC stop motion can be programmed to signal a failure to the operator.

As indicated above, although a post member having a rectangular cross section is disclosed, a different shaped post may be used for different gauging approach directions, depending upon the particular application. Such a situation may present itself where approach directions other than along the Z and/or X axes are required, for example, an octagonal shaped post would permit a 45° approach direction for calibration purposes as well as both the X and Z axes.

While there has been shown and described what is at present considered to be the preferred embodiment of the invention, modifications thereto will readily occur to those skilled in the art. For example, although the invention has been described, for purposes of illustration as being used in connection with a numerically controlled lathe, it will be clear to those skilled in the art that the invention is not limited to lathes but may, to advantage, be incorporated for use with other machine tools or machining systems wherein precise positioning of an object is to be attained. It is not desired, therefore, that the invention be limited to the specific implementations shown and described, but it is intended to cover all such modifications, alterations and changes falling within the spirit and scope of the invention as defined in the appended claims.

I claim:

1. A method of tool touch probing for determining the desired dimension on a workpiece being machined, comprising the steps of:
   locating fixed datum surface means a calibrated distance away from the rotational axis of the workpiece;
   vibrating said datum surface means;
   bringing a machine tool, which may be comprised of a cutting tool, mounted on a machining system into contact with said datum surface means and sensing vibrations emanating therefrom;
   determining the position of the surface of said tool when said datum surface means is touched;
   bringing said tool into predetermined contact with said workpiece and sensing said workpiece contact;
   determining the position of said tool surface when said workpiece is touched; and
   differencing the two positions of contact and determining therefrom the desired dimension.

2. The method as defined by claim 1 wherein said datum surface means includes a reference post which is oriented orthogonally with respect to the rotational axis of the workpiece.

3. The method as defined by claim 2 and wherein said steps of sensing upon contact with said datum surface means and said workpiece include sensing with an accelerometer mounted on the machining system in relatively close proximity to the machine tool.

4. The method of claim 3 and wherein said step of bringing said tool into predetermined contact with said workpiece comprises bringing said tool into rubbing contact with said workpiece.

5. The method as defined by claim 4 wherein said step of vibrating said datum surface means comprises the step of sonically vibrating said reference post.

6. The method as defined by claim 5 wherein saidstep of sonically vibrating said reference post comprises ultrasonically vibrating said reference post in a longitudinal mode.

7. The method as defined by claim 6 wherein said machine tool is movable on two mutually perpendicular axes.

8. The method as defined by claim 7 wherein said tool comprises a cutting tool located on a rotatable turret of a lathe.

9. The method as defined by claim 1 wherein said machining system comprises a programmable numerically controlled machining system including numerical control means adapted to operate under the direction of a selected machining program.

10. The method as defined by claim 9 wherein said steps of determining the position of said tool when said datum surface means is touched and when said workpiece is touched also includes the step of storing said positions whereby differencing of said position can thereafter be made and determining the desired dimension can be carried out in said numerical control means.

11. Apparatus for precisely locating the surface of a cutting tool positionable within the coordinate reference system of a machine tool adapted to provide cutting tool position signals for numerical control, comprising:
   a datum reference surface fixedly positioned within said coordinate reference system at a precisely known location therein;
   means for causing said datum reference surface to vibrate;
   sensor means located in relative proximity to said cutting tool and adapted to respond to vibrations occurring in said cutting tool for providing a signal indicative of said vibrations;
   means for positioning the cutting tool to effect contact between the cutting tool surface and said datum reference surface; and
   means for receiving said vibration indicative signal and said cutting tool position signals, the vibration indicative signal occurring at said contact and said cutting tool position signals being indicative of the precise position of the tool surface.

12. The apparatus of claim 11 wherein said datum reference surface is formed through at least one right angle to provide a vibrating datum surface parallel to two orthogonal axes.

13. The apparatus of claim 12 wherein said datum reference surface is in the form of an elongated rod having a square cross section perpendicular to its longitudinal axis.

14. The apparatus of claim 13 wherein said sensor means is an accelerometer.

15. The apparatus of claim 14 wherein said means for causing said datum surface to vibrate comprises at least one piezoelectric element attached to said datum surface and an oscillator causing energization of said piezoelectric element at an ultrasonic frequency.

16. The apparatus of claim 15 wherein said datum surface is adapted to vibrate in a longitudinal mode.

17. The apparatus of claim 15 wherein the accelerometer is resonant at the ultrasonic energization frequency.

18. For gauging the dimensions of a workpiece mounted for machining in a machine tool, a method for using the cutting tool of the maching tool as a gauging probe, comprising the steps of:

(a) providing a datum surface disassociated from the workpiece mounted at a precisely known, fixed location within a coordinate reference system of the machine tool;

(b) causing the datum surface to vibrate;

(c) bringing the cutting tool surface into contact with the datum surface and detecting the contact occurrence by vibrations through said cutting tool to a vibration sensor;

(d) using the detected contact of step (c) to establish the position of the cutting tool surface;

(e) while the workpiece is in motion, bringing the cutting tool surface into contact with the workpiece at a point thereon at which a dimension is to be determined and detecting contact occurrence by tool rubbing vibrations transmitted through said cutting tool to the vibration sensor;

(f) determining from the detected contact of step (e) the position of the workpiece surface at the point of contact; and (g) determining the position of the workpiece surface relative to a reference position within the coordinate reference system as a measure of the dimension of the workpiece.

19. The method of claim 18 wherein the workpiece is being rotated and the reference position is the axis of rotation.

20. The method of claim 18 wherein the datum reference surface is caused to vibrate at an ultrasonic frequency and the vibration sensor is an accelerometer having a reasonance response at the ultrasonic frequency.

* * * * *

Disclaimer 4,554,495.—*Richard K. Davis*, Charlottesville, Va. DATUM REFERENCE FOR TOOL TOUCH PROBE SYSTEM. Patent dated Nov. 19, 1985. Disclaimer filed Feb. 5, 1986, by the assignee, *General Electric Co.*

Hereby enters this disclaimer to claims 13, 15, 16 and 17 of said patent.

[*Official Gazette October 7, 1986.*]

UNITED STATES PATENT AND TRADEMARK OFFICE
CERTIFICATE OF CORRECTION

PATENT NO. : 4,554,495

DATED : November 19, 1985

INVENTOR(S) : Richard K. Davis

It is certified that error appears in the above—identified patent and that said Letters Patent are hereby corrected as shown below:

On the cover page, the Assignee, shown as "Ormand R. Austin, Charlottesville, VA", should read --General Electric Company, Charlottesville, VA--.

Signed and Sealed this

Ninth Day of December, 1986

Attest:

DONALD J. QUIGG

Attesting Officer

Commissioner of Patents and Trademarks